US008837360B1

(12) United States Patent
Mishra et al.

(10) Patent No.: US 8,837,360 B1
(45) Date of Patent: Sep. 16, 2014

(54) DETERMINING GEOGRAPHIC LOCATION OF NETWORK HOSTS

(75) Inventors: Arunesh Mishra, Sunnyvale, CA (US);
Zhengrong Ji, Sunnyvale, CA (US);
Marc Stogaitis, San Mateo, CA (US);
Tsuwei Chen, Cupertino, CA (US)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 12/966,659

(22) Filed: Dec. 13, 2010

Related U.S. Application Data

(60) Provisional application No. 61/282,069, filed on Dec. 11, 2009.

(51) Int. Cl.
| | | |
|---|---|---|
| *H04W 4/00* | (2009.01) | |
| *H04L 12/28* | (2006.01) | |
| *H04J 3/16* | (2006.01) | |
| *G06F 15/16* | (2006.01) | |
| *G06F 3/14* | (2006.01) | |

(52) U.S. Cl.
USPC ........... 370/328; 370/255; 370/346; 370/254; 370/338; 455/422.1; 455/456.1; 455/456.2; 455/456.5; 455/435.1; 709/217; 709/218; 709/224; 709/225; 709/219; 715/760

(58) Field of Classification Search
CPC ...... H04W 40/20; H04W 64/00; H04W 84/22
USPC .......................... 370/254, 255, 328, 338, 346; 455/422.1, 435.1, 456.1, 456.2, 456.3, 455/456.5, 457; 709/217–219, 224, 225; 715/760
See application file for complete search history.

(56) References Cited

U.S. PATENT DOCUMENTS

| | | | | |
|---|---|---|---|---|
| 6,523,064 B1* | 2/2003 | Akatsu et al. | ................. | 709/226 |
| 6,665,611 B1* | 12/2003 | Oran et al. | .................... | 701/472 |
| 6,665,715 B1* | 12/2003 | Houri | ............................. | 709/223 |
| 6,684,250 B2* | 1/2004 | Anderson et al. | ............. | 709/225 |
| 6,704,873 B1* | 3/2004 | Underwood | ..................... | 726/12 |
| 6,757,740 B1* | 6/2004 | Parekh et al. | ................. | 709/245 |
| 6,973,313 B1* | 12/2005 | Sebastian | ...................... | 455/445 |
| 7,194,354 B1* | 3/2007 | Oran et al. | .................... | 701/408 |
| 7,200,673 B1* | 4/2007 | Augart | ......................... | 709/238 |
| 7,673,032 B1* | 3/2010 | Augart | ......................... | 709/223 |

(Continued)

OTHER PUBLICATIONS

Padmanabhan et al., "An Investigation of Geographic Mapping Techniques for Internet Host," SIGCOMM '01, Aug. 27-31, 2001, San Diego, California, 13 pages.

(Continued)

*Primary Examiner* — Brian J Gillis
*Assistant Examiner* — Shean Tokuta
(74) *Attorney, Agent, or Firm* — Bracewell & Giuliani LLP

(57) ABSTRACT

Embodiments of the present invention are directed to determining the geographic location of network entities. An embodiment is a method of determining the geographic location of a host including, identifying at least one gateway communicatively coupled to the host, determining a geographic location of the at least one gateway based upon a proximity relationship between the gateway and a localizable entity, and determining the geographic location of the host based upon the determined geographic location of the at least one gateway. Another embodiment is a method for a host to determine its geographic location by determining reachability information to communicatively coupled network entities, sending the reachability information to a location server, and by receiving geographic location information from the location server.

20 Claims, 10 Drawing Sheets

(56) References Cited

U.S. PATENT DOCUMENTS

| | | | |
|---|---|---|---|
| 7,696,923 B2* | 4/2010 | Houri | 342/357.66 |
| 7,764,231 B1* | 7/2010 | Karr et al. | 342/457 |
| 8,131,834 B1* | 3/2012 | Augart | 709/223 |
| 2002/0016173 A1* | 2/2002 | Hunzinger | 455/456 |
| 2003/0060214 A1* | 3/2003 | Hendrey et al. | 455/456 |
| 2003/0097439 A1* | 5/2003 | Strayer et al. | 709/224 |
| 2003/0134648 A1* | 7/2003 | Reed et al. | 455/456 |
| 2003/0157942 A1* | 8/2003 | Osmo | 455/456 |
| 2003/0184595 A1* | 10/2003 | Kodosky et al. | 345/810 |
| 2003/0187949 A1* | 10/2003 | Bhatt et al. | 709/218 |
| 2003/0227911 A1* | 12/2003 | Trossen | 370/352 |
| 2004/0092271 A1* | 5/2004 | Viikari et al. | 455/456.2 |
| 2004/0103204 A1* | 5/2004 | Yegin | 709/229 |
| 2004/0157624 A1* | 8/2004 | Hrastar | 455/456.1 |
| 2004/0176103 A1* | 9/2004 | Trossen et al. | 455/456.3 |
| 2004/0196834 A1* | 10/2004 | Ofek et al. | 370/352 |
| 2004/0199623 A1* | 10/2004 | Houri | 709/223 |
| 2004/0210654 A1* | 10/2004 | Hrastar | 709/224 |
| 2005/0021738 A1* | 1/2005 | Goeller et al. | 709/224 |
| 2005/0195753 A1* | 9/2005 | Chaskar et al. | 370/254 |
| 2005/0228860 A1* | 10/2005 | Hamynen et al. | 709/203 |
| 2006/0025154 A1* | 2/2006 | Alapuranen et al. | 455/456.1 |
| 2006/0035646 A1* | 2/2006 | Fox et al. | 455/456.1 |
| 2006/0188073 A1* | 8/2006 | Wright | 379/45 |
| 2006/0206586 A1* | 9/2006 | Ling et al. | 709/219 |
| 2007/0126635 A1* | 6/2007 | Houri | 342/451 |
| 2007/0155403 A1* | 7/2007 | Bishop | 455/456.1 |
| 2007/0178913 A1* | 8/2007 | Niemenmaa et al. | 455/456.4 |
| 2007/0178914 A1* | 8/2007 | Montenegro | 455/456.5 |
| 2007/0264969 A1* | 11/2007 | Frank et al. | 455/404.2 |
| 2008/0037536 A1* | 2/2008 | Padmanabhan et al. | 370/389 |
| 2008/0186929 A1* | 8/2008 | Rice et al. | 370/338 |
| 2008/0275978 A1* | 11/2008 | Houri | 709/223 |
| 2009/0119394 A1* | 5/2009 | Winkler | 709/223 |
| 2010/0020776 A1* | 1/2010 | Youssef et al. | 370/338 |
| 2010/0094981 A1* | 4/2010 | Cordray et al. | 709/222 |
| 2010/0177699 A1* | 7/2010 | Klefter et al. | 370/328 |
| 2010/0317317 A1* | 12/2010 | Maier et al. | 455/404.2 |

OTHER PUBLICATIONS

Farrell et al., "DNS Encoding of Geographical Location," Network Working Group, Request for Comments 1712, Nov. 1994, pp. 1-7.

* cited by examiner

| Network Entity 402 | Node type 404 | Location 406 | Range 408 | Co-located nodes 410 | Reachable nodes 412 |
|---|---|---|---|---|---|
| Gateway 112 <int 141, Ethernet> | Gateway | <Location based on entity 131> | <entity 131 WIFI+Ethernet> | Gateway 112 <int 173 WIFI> | Entity 131, WIFI AP, direct proximity |
| Gateway 112 <int 141, Ethernet> | Gateway | <Location based on entity 132> | <Ethernet> | Gateway 112 <int 173 WIFI> | Entity 132, WIFI AP, indirect proximity |
| Entity 131 | WIFI AP | <Location coordinates> | <WIFI range> | | <Gateway 112, int 173 WIFI/141 Ethernet, direct> |
| Entity 131 | WIFI AP | <Location coordinates> | <WIFI range> | | <Gateway 111, int 142 Ethernet/161 Ethernet, indirect> |

FIG. 4

DETERMINING GEOGRAPHIC LOCATION OF NETWORK HOSTS

CROSS REFERENCE TO RELATED APPLICATIONS

This application claims the benefit of U.S. provisional application No. 61/282,069, filed on Dec. 11, 2009, which is hereby incorporated by reference in its entirety

BACKGROUND

1. Technical Field

The field relates to determining the geographic location of entities in a communication network.

2. Background Art

Methods of determining the location of network entities are often implemented in wireless networks. Many wireless communications end-user devices, such as mobile telephones and personal digital assistants, have incorporated global positioning system (GPS) devices that enable the user as well as the network to determine the current geographic location of the device to a high degree of accuracy. In wireless cellular telecommunications networks, each end-user device is connected to the network through a cellular base station. The locations of the cellular base stations are generally known through various methods, and therefore the locations of end-user devices that are connected to the network directly through a particular cellular base station can be determined based on the known location of the respective cellular base station, or based on one or more cellular base stations that are within range of the end-user device. Similarly, in many other widely deployed types of wireless networks, such as WIFI, WIMAX and like networks, the locations of base stations that connect end-user devices to the network are known.

While the wireless base station with which an end-user device is currently associated with can determine the location of the end-user device with respect to the coverage area of the base station, other methods, such as triangulation and trilateration using multiple base stations with which an end-user device is associated, can yield higher accuracy in location determination.

Some network entities may also utilize Internet Protocol (LP)-based geo location. In LP-based geo location the location of a network entity is determined based on its assigned LP address. For example, a query to a service such as WHOIS can return the approximate location of the subnet having a particular IP address. However, IP-based geo location is error-prone due to several factors. In one aspect, IP-addresses assigned to end-user devices change frequently. In another aspect, the geo-location information that is available based on IP-based services may not be sufficiently accurate. For example, the accuracy achieved by conventional IP-based services are generally at the city-level.

With the increasing deployment of location-based services (LBS), it would be useful to have methods and systems that can determine the geographic location of various networked devices including devices having wired and/or wireless interfaces, devices that are static in the network, and devices that have some level of mobility within one or more communication networks. Therefore, methods and systems to determine the geographic location of various types of networked devices are desired.

SUMMARY

Embodiments of the present invention are directed to determining the geographic location of network entities. An embodiment is a method of determining the geographic location of a host including, identifying at least one gateway communicatively coupled to the host, determining a geographic location of the at least one gateway based upon a proximity relationship between the gateway and a localizable entity, and determining the geographic location of the host based upon the determined geographic location of the at least one gateway.

Another embodiment is a method for a host to determine its geographic location by determining reachability information to communicatively coupled network entities, sending the reachability information to a location server, and by receiving geographic location information from the location server.

Yet another embodiment is a system for determining the geographic location of a host. The system includes at least one processor, a network interface coupled to the processor, at least one memory coupled to the processor, and a location server. The location server is configured to identify one or more gateways coupled to the host, to determine a geographic location of the at least one gateway based upon a proximity relationship between the gateway and a localizable entity, to determine the geographic location of the host based upon the determined geographic location of the at least one gateway, and to transmit the host's geographic location.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4 illustrates a location database table at the location server, according to an embodiment of the present invention.

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

Embodiments of the present invention include methods and systems for determining the geographic locations of entities or nodes in communications networks. Embodiments of the present invention can be used to determine the geographic location of various network-connected nodes (e.g., hosts and other network entities), and are particularly useful in determining the geographic location of hosts that are not directly associated with a wireless network in which the geographic locations of the access points (or base stations) are predetermined. For example, embodiments of the present invention can be particularly useful to determine the location of desktop computers connected to a wired Ethernet network that is directly or indirectly connected to a wireless network.

System

Figure 1:
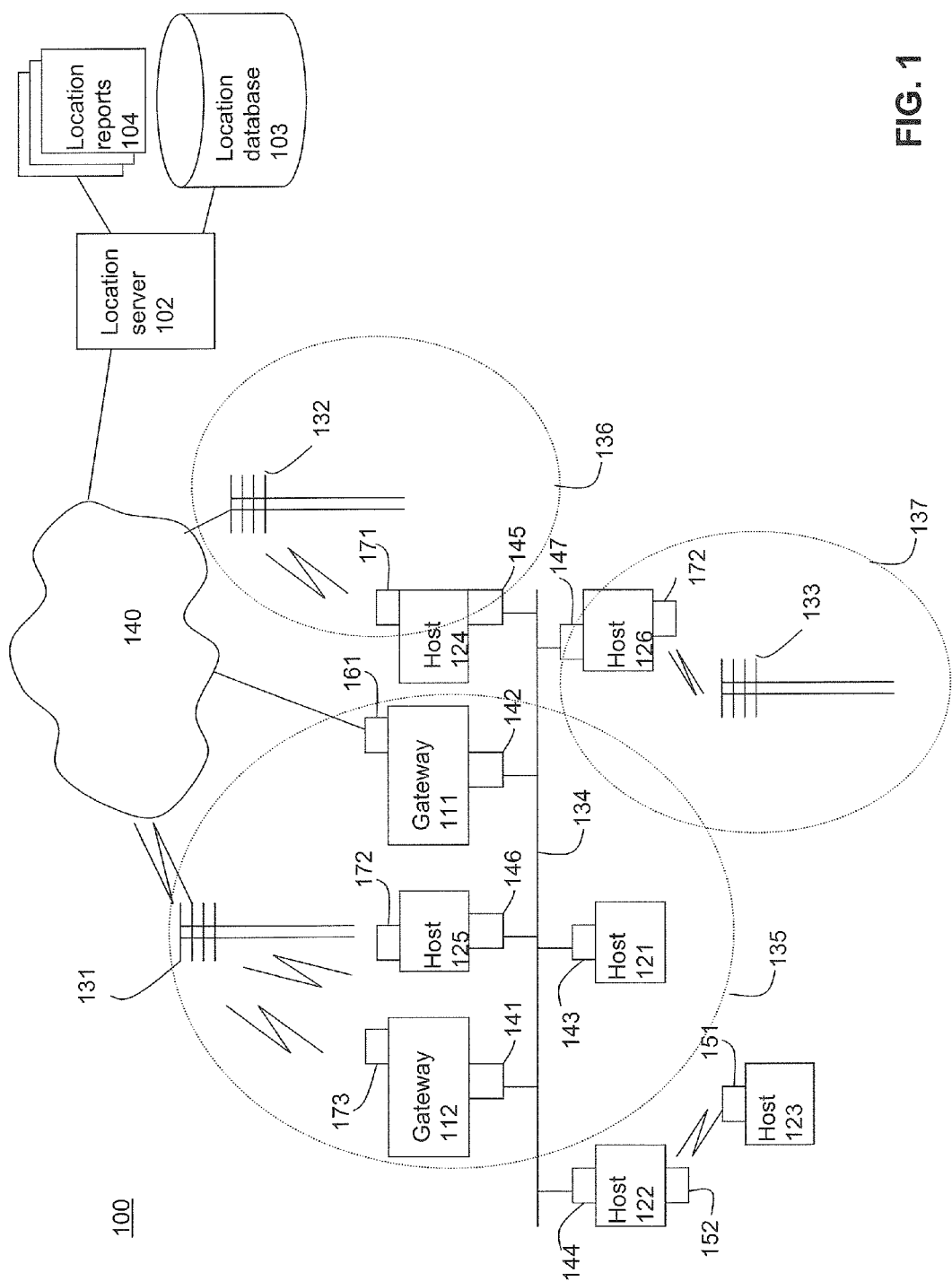
FIG. 1 is a diagram illustrating a system for determining the location of network nodes, according to an embodiment of the present invention.

FIG. 1 is a diagram illustrating a system 100 for determining the location of network entities, according to an embodiment of the present invention. A location server 102 is communicatively coupled to a network 140. Location server 102 collects location-related information from network entities including a plurality of end-user devices (hereafter "hosts") such as hosts 121-126. Each host can send periodic reports of its network neighborhood to location server 102. Hosts can include desktop computers, laptop computers, mobile computing devices, mobile telephones, printers, home and office appliances, and the like. Based upon the collected location-related information, location server 102 provides a location determination service to network entities. For example, location server 102 can process network data received from multiple network entities to determine relationships between network entities with known geographic locations and other network entities. For example, the geographic location of cellular base station 131 is known. Therefore, the location of host 121, which is on a wired network 134 with gateway 112 that has an interface 173 coupled to cellular base station 131, can be estimated to be within the coverage area 135 of base station 131. Thus, a geographic relationship between host 121 and base station 131 can be established. Network entities can then query location server 102 to request their respective geographic locations.

Figure 5:
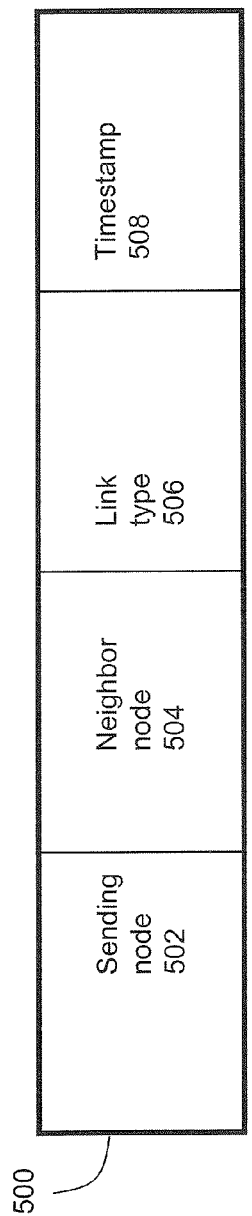
FIG. 5 illustrates a location report sent by a host, according to an embodiment of the present invention.

Location server 102 can be coupled to one or more databases, such as location database 103 and locations reports database 104. Herein, the term "database" is intended to encompass any structured collection of data and mechanisms to access the collection, and does not necessarily imply a database management system (DBMS). Location reports database 104 contains location reports received from network entities. An exemplary format for a location report 500 is shown in FIG. 5. Location database 103 contains the relationships among network entities derived, for example, from processing the location reports 104. Relationships among network entities, more specifically, geographic relationships among network entities are also referred to herein as "proximity relationships." Location database 103 can contain one or more tables such as table 400 (illustrated in FIG. 4) which is, according to an embodiment, a table of proximity relationships.

Network 140 couples location server 102 to other network entities, according to an embodiment. Network 140 can be the Internet and/or one or more other communications networks. Exemplary networks 140 include Internet Protocol (IP) networks. As would be known to persons skilled in the art, IP enables communication between network entities coupled to interconnected homogeneous or heterogeneous communication networks. For ease of description only, the system 100 is assumed to be an IP-based network. It should be noted that the teachings in this disclosure are applicable to any type of communication network.

Gateways, such as gateways 111-112, provide connectivity to hosts such as hosts 121-126 to network 140. As used herein, a "gateway" can be any network entity with connectivity to two or more networks, and includes routers that route data between networks. Gateway 111 is coupled to network 140 via wired network interface 161, and to local area network 134 via network interface 142. Gateway 112 is coupled to cellular wireless base station 131 via wireless network interface 173, and to local area network 134 via network interface 141.

Hosts 121, 122, 124 and 125 are coupled to wired local area network 134 via wired interfaces 143, 144, 145 and 146, respectively. Host 122 and host 123 communicate with each other over respective wireless interfaces 152 and 151. In an embodiment, the interfaces 151 and 152 comprise a Bluetooth network.

Interface 171 of host 124 is coupled to a wireless base station 132. Wireless base station 132 can be a cellular base station or a wireless access point. In the following description, the terms "base station" and "access point" are used interchangeably.

In various embodiments, wireless base station 131 can be one or more of cellular wireless base station (e.g., 3G cellular network), WIFI (e.g., IEEE 802.11g) network access point, WIMAX access point, and the like. For purposes of description, base station 131 can be considered a wireless access point of which the geographic location is known. Gateway 112, with interface 173 coupling to base station 131 over the corresponding wireless network, is within the coverage area 135 of base station 131. Host 124, with its interface 171 coupling to base station 132, is within the coverage area 136 of base station 132. Host 126, with its interface 172 coupling to base station 133, is within the coverage area 137 of base station 133.

As used herein, a "localizable entity" is a network entity of which the geographic location is previously known. For example, base station 131 is a localizable entity if its location is known. Localizable entities include cellular base stations, WIFI access points, and other wireless network access points for which the respective geographic locations are known. The location of a localizable entity can be known by one or more methods such as, GPS or manual configuration.

Localizable entities can also include hosts whose location has been recently computed and are transiently connected to a wired network. Such hosts can either, through proximity propagate their location to the wired gateways, or can establish a proximity relation between one or more wired gateways and/or other wireless access points in proximity to the host, for example, using the host's location which may already be available. In the case where the host's location was computed using GPS or some other means where no proximity to wireless access points can be established, the host's location can be changed (if the privacy of the host or host's user is a concern) within a predetermined tolerance level before proximity relationships are established with gateways.

A "gateway", according to the teachings herein, is a network entity that has two or more network interfaces to separate networks. A gateway is a network entity that routes communication data from one network to another. Gateway 111, for example, routes data packets between wired network 134 and network 140. Gateway 112 also routes data packets between wired network 134 and network 140.

As the term is used herein, "host" refers to a network entity such as a desktop computer or other device that requires knowledge of its location, for example, to receive location-based services (LBS). A host, in embodiments of the present invention, would include the location determiner module (described below, including with respect to FIG. 3) to determine its geographic location.

According to an embodiment, hosts 121-126 monitor their respective network interfaces and periodically transmit location reports to location server 102. By using various passive and active monitoring methods using their respective interfaces to network 134, hosts 121-122, and 124-126 can detect the presence of each other and gateways 111 and 112 on network 134. For each network entity connected to network 134, hosts 121-122, and 124-126, can also determine each of the addresses associated with multiple interfaces associated with that network entity. Host 125 also detects wireless base station 131 through its wireless interface 172. Host 124 detects wireless base station 132 through its wireless interface 171. Host 122 also detects host 123 through its wireless Bluetooth interface 152. Periodically, each host transmits the respective detections as location reports to location server 102.

Location server 102 receives and, in an embodiment, stores the location reports from hosts in location reports database 104. By processing the location reports, location server 102 can determine that interface 173 of gateway 112 is in the wireless coverage area of base station 131, and because the geographic location of the localizable entity wireless base station 131 is known, can determine the geographic location of gateway 112 to a known level of accuracy. The geographic relationship established between base station 131 and gateway 112 is a proximity relationship. In further processing of the location reports 104 and location database 103, location server 102 can determine that interfaces 173 and 141 are co-located (i.e., in gateway 112) and that interface 141 is on the same local area network 134 with hosts 121-122, and 124-126. Thus, location server 102 can estimate the geographic location of hosts 121-122, and 124-126 based on, for example, the location of gateway 112 and range characteristics (e.g., maximum distance of an Ethernet network) of the wired network 134.

In some embodiments, the geographic location of another host, such as host 123 can be determined based on the determined geographic location of host 122, because host 123 and host 122 are associated by their respective Bluetooth interfaces 151 and 152. In another embodiment, based upon the proximity relationships between gateway 112 and base station 131, and the relationship between gateway 112 and gateway 111, a new proximity relationship can be formed between gateway 112 and base station 131, thus determining the location of gateway 111 which has only wired interfaces.

Proximity relationships between a network entity and two or more localizable entities can be used to more accurately determine the location of the network entity. In some embodiments, techniques such as tri-lateration or triangulation can be used to improve the determined geographic location of the network entity. For example, a proximity relationship can be foamed between gateway 112 and base station 132, with which host 124, which is on wired network 134 with gateway 112, has a direct association. The use of both proximity relations, with base station 131 and base station 132, enables a more accurate geographic location of gateway 112. Further description of processing in location server 102 is specified below with respect to FIGS. 6 and 7.

Location Server

Figure 2:
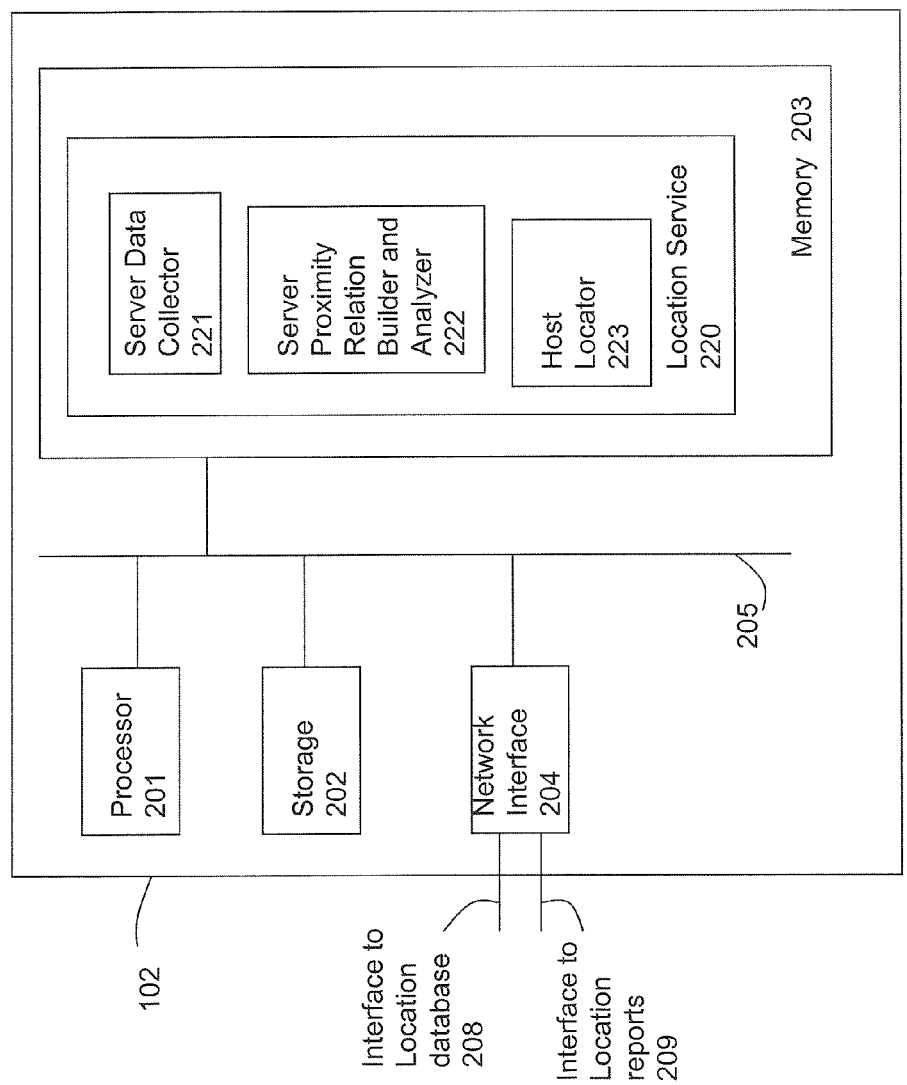
FIG. 2 illustrates a location server, according to an embodiment of the present invention.

FIG. 2 illustrates location server 102, according to an embodiment of the present invention. Location server 102 comprises at least one processor 201, one or more non-volatile storage devices 202, one or more memories 203, one or more network interfaces 204, and one or more system communications infrastructure 205 such as a Peripheral Component Interconnect (PCI) bus, Ethernet, or other like interconnection. Network interfaces 204 couples location server 102 to location database 103 through link 208, and to location reports database 104 through link 209. In addition, network interfaces 204 couples location server 102 to one or more networks, such as network 140. Processor 201 can include one or more commercially available or specially designed processors. Non-volatile storage 202 can include one or more of a hard disk, flash disk, and like non-volatile storage mediums. Memory 203 can comprise of a volatile memory such as dynamic random access memory (DRAM).

In an embodiment, location service 220 resides in memory 203. Location service 220 includes the functionality to collect location reports from network entities including hosts, to process received location reports to determine proximity relationships among network entities, to create and update a location database, and to receive and to respond to location queries from network entities including hosts. Location service 220 comprises a server data collector 221, a server proximity relation builder and analyzer 222, and a host locator 223. Location service 220 can be implemented using any combination of hardware, software, and firmware. In an embodiment, location service 220 is implemented in one or more programming languages and scripting languages such as C, Java, AJAX, Perl Instructions comprising location service 220 can be stored in a non-volatile storage such as 202 or other computer readable storage medium.

Server data collector 221 includes the functionality to collect location reports from network entities. The collection of location reports can be based on, one or both, passively receiving location reports from network entities or actively requesting location reports from selected network entities. The processing in server data collector 221 is further described with respect to FIGS. 6 and 9.

Server proximity relationship builder and analyzer 222 include the functionality to process location reports and other information in order to determine proximity relationships among network entities. Based upon the processing in server proximity relationship builder and analyzer 222, location database 103 can be updated with relationships between network entities. Further description of processing in server proximity relationship builder and analyzer 222 is specified with respect to FIGS. 6 and 7.

Host locator 223 includes the functionality to receive and respond to queries from network entities regarding their respective locations. In response to a location query from a host, for example, host locator can determine the host's location from location database 103. If the host's location is not determinable from the database, the host locator 223 can, in an embodiment, initiate a discovery process based on neighbor information received from the host. Further description of processing in host locator 223 is specified with respect to FIG. 6.

Host

Figure 3:
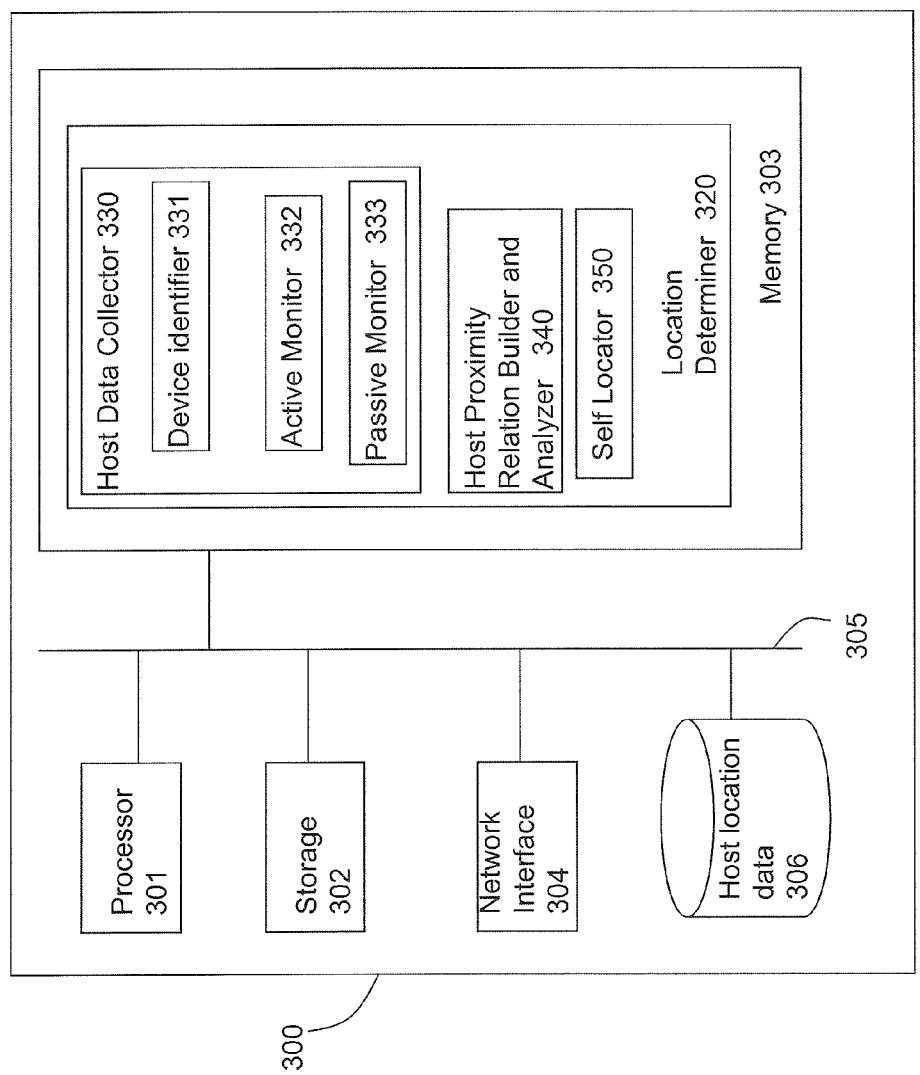
FIG. 3 illustrates a host, according to an embodiment of the present invention.

FIG. 3 illustrates a host 300, according to an embodiment of the present invention. A host can be any network entity that utilizes the teachings in this disclosure to determine its geographic location. Hosts include, but are not limited to, desktop computers, laptop computers, netbook computers, internet appliances, and personal digital assistants. As noted earlier, while embodiments of the present invention can be used to determine the geographic location of a large variety of network entities, hosts and other network entities that are connected to networks through only wired interfaces can utilize embodiments of the present invention particularly effectively.

According to an embodiment, host 300 comprises at least one processor 301, one or more non-volatile storage 302, one or more network interface 304, one or more memory 306, and communication infrastructure 305. Processor 301 can include one or more commercially available and/or specially designed processors. Non-volatile storage 302 can include a non-volatile storage device such as a hard disk, flash disk, or like device. Memory 303 can include a dynamic random access memory. Network interface 304 couples host 300 to the rest of the network. Network interface 304 can include one or more network interfaces each interface corresponding to one or more wireless or wired network connectivity technology. For example, each network interface 304 can corresponding to a wired networking technology such as Ethernet, Fast Ethernet, or Gigabit Ethernet, or a wireless networking technology such as WIFI, WIMAX, ZigBee, and Bluetooth. System communications infrastructure 205 such as a Peripheral Component Interconnect (PCI) bus, Ethernet, or other like interconnection.

Host stored location data 306 can include a database of information about network entities detected by host 300. Host stored location data 306, for example, can include each network entity which was detected over any network interface 304 during a configured time period.

Location determiner 320, in an embodiment, resides in memory 303. Location determiner includes the functionality to monitor the networks with which host 300 is associated with, to collect information with respect to network entities detectable over network interfaces 304, to send location reports to location server 102, and to determine the geographic location of host 300. Location determiner 320 includes a host data collector 330. In an embodiment, location determiner 320 can include a host proximity relation builder and analyzer 340, and a self locator 350. Location determiner 320 can be implemented using any combination of hardware, software, and firmware. In an embodiment, location determiner 320 is implemented in one or more programming languages and scripting languages such as C, Java, AJAX, Perl. Instructions comprising location determiner 320 can be stored in a non-volatile storage such as 302 or other computer readable storage medium.

Host data collector 330 includes the functionality to monitor the host's network interfaces for detectable network entities, to create location reports, and to send the location reports to location server 102. In an embodiment, host data collector 330 includes a device identifier 331, an active network monitor 332, and a passive network monitor 333.

Device identifier 331 includes the functionality to determine a desired type of identifier for one or more of the network entities that are detected by host 300. In an embodiment, device identifier 331 can, for example, determine the hardware address (also known as the media access control or MAC address) of an interface of a neighboring network entity detected based on its IP address.

Active network monitor 332 includes the functionality to actively detect network entities over host's network interfaces. For example, active network monitor 332 can send queries or other messages to generate responses from one or more neighboring network entities. Active network monitor 332 can then detect neighboring network entity information based on the received responses.

Passive network monitor 333 includes the functionality to passively detect network entities over host's network interfaces. For example, passive network monitor 333 can send passively monitor or "sniff" packets of frames on each of the network interfaces 304 that is connected to an active network.

In some embodiments, host 300 can include the capability to determine its own location based on neighboring network entity information and/or other network entity information received from location server 102. Host proximity relation builder and analyzer 340 and self locator 350 includes the functionality to enable host 300 determine its own geographic location.

Host proximity relation builder and analyzer 340 include the functionality to process network entity information collected by host 300 and determine proximity relationships. Such determinations of proximity relationships based on information collected by only host 300 can, however, be improved by the use of data collected from several hosts. For example, in an embodiment, host 300 can also use proximity relationships determined by location server 102 that are periodically downloaded to host 300.

Self locator 350 includes the functionality for host 300 to determine its location. Self locator 350 can determine its location by querying location server 102. In another embodiment, self locator 350 can determine its location by querying location information stored in host 300, for example, in host location data 306.

Location Database

FIG. 4 illustrates an exemplary database table 400 in location database 103. Table 400 comprises respective columns for network entity 402, type of network entity 404, location of network entity 406, range of network entity 408, list of nodes co-located with network entity 410, and list of nodes reachable from network entity 412. In an embodiment, each interface of a localizable entity and each interface of a gateway that is present in location reports, known from another source, and/or known from configuration, is listed as a separate row in table 400. In another embodiment all interfaces belonging to a respective network entity will be listed in a separate row. The network entity 402 column identifies a network entity or an interface of a network entity by one or more identifiers such as a MAC address, an IP address, and the like. The network entity type 404 column identifies the type of network entity or type of interface, such as wired Ethernet, cellular wireless, WIFI, WIMAX, and the like. The location 406 column specifies the currently determined location of the network entity. The location can be specified, for example, using latitude longitude coordinates. Column 408 can specify the known or estimated range of the network entity. For example, each type of wireless base station can be associated with a range which defines its coverage area (such as 135 in FIG. 1). Likewise, local area networks, such as Ethernet networks, are associated with a maximum distance between connected nodes. Column 410 is a list of other network entities or corresponding network interfaces that are co-located with the network entity listed in the corresponding row in column 402. An interface is "co-located" when it is on the same platform. For example, interfaces 173 and 141 are co-located in gateway 112. Column 412 lists other network entities or network interfaces that are communicatively reachable by the network entity listed in the corresponding row in column 402. For example, the row corresponding to interface 141 of gateway 112 can list interfaces 142-147 as reachable network entities.

Rows 422-425 show some exemplary proximity relations based on system 100 that can be stored in location database 103, according to an embodiment of the present invention. Rows 422-423 represent the respective proximity relationships that gateway 112 has with localizable entities 131 and 132. Gateway 112 can be identified by its Ethernet interface to network 134. In location column 406, the location of gateway 112 determined respectively based on entities 131 and 132 are specified. In the range 408 column, with respect to entity 131 which is a direct proximity relationship, gateway 112 can specify a maximum range of the sum of the WIFI range and the Ethernet range from its location. With respect to entity 132 which is an indirect proximity relationship, gateway 112 can specify a maximum range of its Ethernet range because it is not within the wireless coverage area of entity 132. In the reachable nodes column, each reachable localizable entity can be specified together with an indication whether the proximity relationship is direct or indirect. Rows 424-425 represent some of the entries made for localizable entity 131. As shown, each localizable entity can have a separate row with respect to each proximity relationship. The location can be specified in absolute terms or as a range. In some embodiment, relationships between hosts and gateways, and hosts and localizable entities can also be stored in table 400.

A person skilled in the art would recognize that the information in location database 102 can be organized, stored, and accessed in many different ways, in addition to what is illustrated in exemplary table 400. It should also be noted that more or less elements of information for each network entity can be stored in location database 102, than shown in table 400. For example, for each network entity, an estimate of the confidence associated with the geographic location determination, and/or the specification of an area (rather than just a point) can be specified. In another embodiment, with each row, a timestamp reflecting the last update to the location can be specified.

In another embodiment, host information, such as interface addresses of hosts are not stored in location database 103. Host information, for example, is received and processed to determine proximity relationships between gateways and localizable network entities. The host information can be discarded after the proximity relationships are created. In some embodiments, host information may not be stored, for example, due to privacy concerns.

FIG. 5 illustrates a location report 500 sent from a host to the location server, according to an embodiment of the present invention. A host may send multiple location reports such as location report 500, one for each co-located or reachable network entity or network interface. Location report 500 comprises a column 502 specifying the originating host or originating host interface, a column 504 specifying the network entity and the type of entity (if available) that is detected, a column 506 specifying the type of link (e.g., wired Ethernet, cellular wireless, WIFI, co-located, etc.) over which the network entity is detected, and a column 508 indicating the time at which the network entity was detected. In other embodiments, location reports may have different information and/or organization. For example, in some embodiments, a location report can contain more information such as a list of all interfaces associated with a network entity.

Method to Determine Host Location

Figure 6:
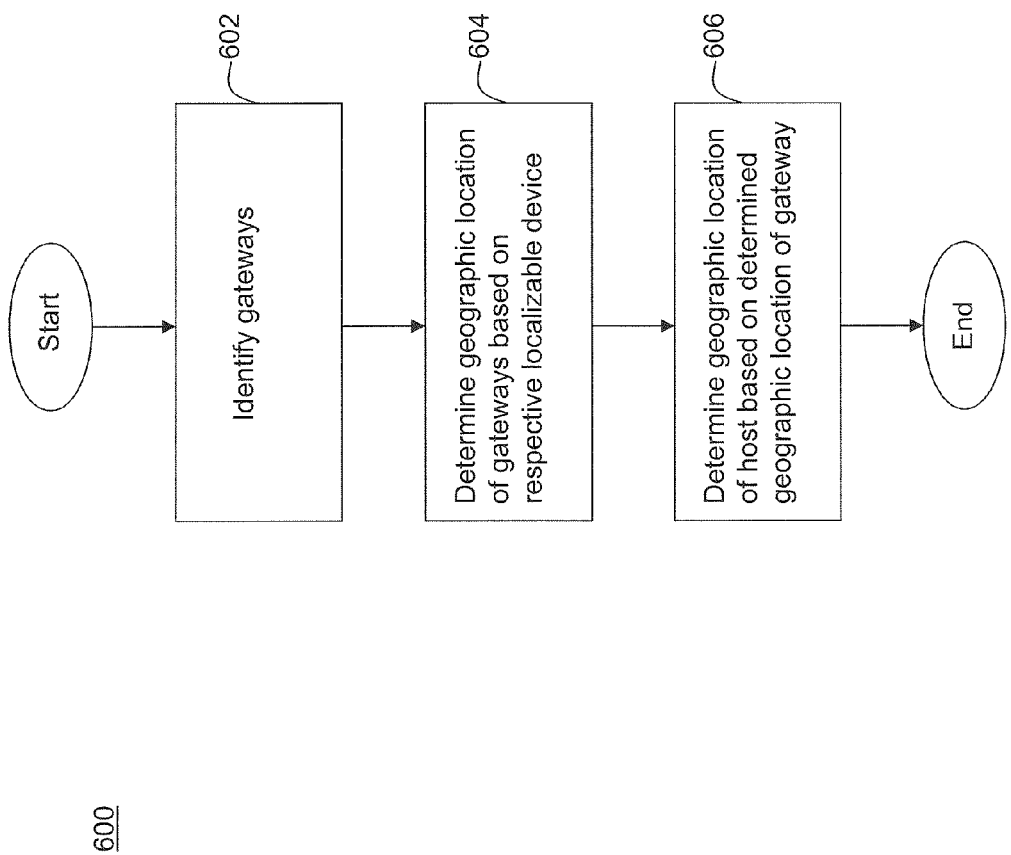
FIG. 6 is a flowchart of a method implemented at a location server to determine the geographic location of a host, according to an embodiment of the present invention.

FIG. 6 illustrates a flowchart of a method 600 to determine the geographic location of network entities, according to an embodiment of the present invention. In an exemplary embodiment, method 600 can be used to determine the current geographic location of a host (referred to below as "querying host") that queries a location server, such as location server 102. Method 600, for example, can be implemented by location service 220 of location server 102.

In step 602 one or more gateways associated with the querying host are identified. In an embodiment, the gateways are identified based upon location reports received from hosts. For example, as noted above and further described below with respect to FIG. 10, each host can generate location reports that are periodically sent to a location server. An exemplary location report is shown in FIG. 5.

In an embodiment, the location reports received from the querying host already identify one or more gateways to which the querying host is communicatively coupled. In another embodiment, location reports from one or more other hosts on the same network as the querying host may have provided more detailed location reports identifying gateways on the network. One or more location reports may identify that a node has multiple interfaces, and the analysis of location reports can reveal direct or indirect proximity relationships from the multiple interfaces to localizable entities. In an embodiment, nodes having multiple interfaces, and are not hosts, can be determined as gateways. The determining of gateways is further described below with respect to FIG. 9.

In step 604, the geographic location of at least one of the gateways identified in step 602 is determined. The geographic location of the gateway is determined based upon a proximity relationship between the gateway and at least one localizable network entity.

In an embodiment, the location reports are analyzed to determine localizable entities and gateways. A localizable entity can be determined based on several techniques. In one embodiment, a host sending a location report identifies a detected node as a localizable node. Such identification can be available when the reporting host is directly coupled to a localizable entity through a wireless network (e.g., host 124). In another embodiment, a localizable entity such as a WIFI base station can be identified based on the detected nodes and the type of link over which each node is detected. For example, when host 124 reports that a node 132 is reachable over WIFI interface 132, then node 132 can be determined as a localizable entity. In another embodiment, localizable entities may be known through other methods, such as, one or more of, configuration, network information provided by network providers such as cellular network providers, and the determination of a base station location by correlating the GPS coordinates of devices communicatively associated with that base station. The determining of gateways was described above. Proximity relationships are formed between detected gateways and localizable entities.

In step 606, the geographic location of the querying host is determined based upon the location of one or more of gateways for which proximity relationships to localizable network entities were determined.

In an embodiment, the location of the querying host is determined based on one or more proximity relations of gateways associated with the querying host. In an exemplary embodiment, the geographic location of host 121 can be determined based on the following proximity relationships: direct proximity relationship from gateway 112 to base station 131, indirect proximity relationship from gateway 112 to base station 131, indirect proximity relationship from gateway 111 to base station 131, and indirect proximity relationship from gateway 111 to base station 132. With respect to each of these proximity relationships, or determined gateway locations, the location of host 121 can be computed as a region defined by a circle or other geometric shape such as a Closed B-spline curve. The size and shape of such a region can differ based on characteristics of the localizable entity, and the network with which the querying host is associated with. The shapes and sizes of regions corresponding to various combinations of localizable entity and network can be preconfigured. In one embodiment, the location of querying host can be determined as the intersection of the respective regions corresponding to the multiple proximity relationships that are applicable to the querying host. In another embodiment, a location may be determined based on triangulating the multiple gateway or corresponding localizable entity locations. In yet another embodiment, such triangulation can be weighted to favor direct proximity relationships over indirect proximity relationships.

Method 600 is described above as a method implemented on location server. However, in another embodiment, method 600 can execute on other network entities including on a querying host. For example, a querying host can periodically download partial information from location database 103 to be stored locally.

Figure 7:
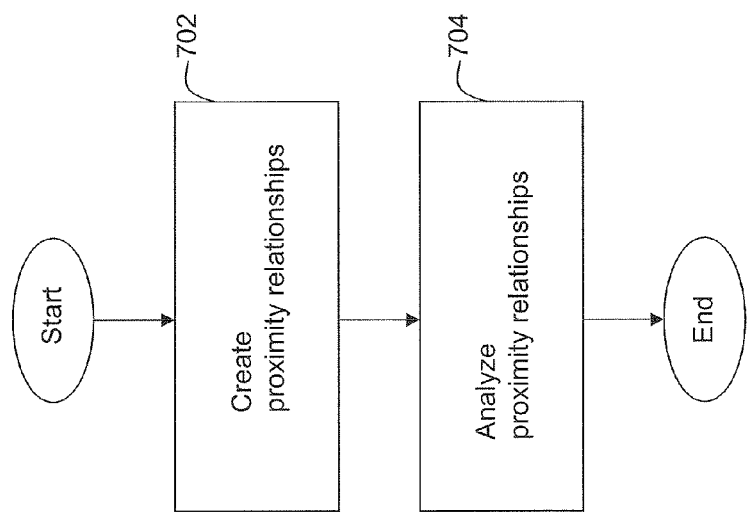
FIG. 7 is a flowchart of a method to determine geographic locations of gateways, according to an embodiment of the present invention.

FIG. 7 illustrates the processing of step 604, according to an embodiment of the present invention. In step 702, proximity relationships are created from gateways to localizable entities. As noted above, proximity relationships can be direct or indirect. Creation of proximity relationships, according to an embodiment, is described below with respect to FIG. 8.

In step 704, the proximity relationships are analyzed to determine the location of each gateway. For example, gateway 112 can have multiple proximity relationships, a direct proximity relationship with localizable entity 131 and indirect proximity relationships with localizable entity 132 and localizable entity 133. According to an embodiment, with respect to the direct proximity relationship, gateway 112 can be considered as located in the mid-point of the coverage area of the corresponding localizable entity. With respect to each of the indirect proximity relationships individually, gateway 112 can be considered to be located at a predetermined percentage portion of the maximum range of the network gateway 112 has in common with the corresponding host or gateway though which the relationship to the respective localizable entity is established. For example, in one embodiment, the location of gateway 112 may be determined as the center of a triangle that has as its vertices, localizable entity 131, a point on the line connecting localizable entities 131 and 133 which is a predetermined distance from 133 based on the range of the network 134, and a point on the line connecting localizable entities 131 and 132 which is a predetermined distance from 132 based on the range of the network 134. Various other methods of estimating the location of gateway 112 are available, for example, where the locations of localizable entities represented in each corresponding proximity relationship of the gateway can be triangulated after a predetermined error factor is added to each location that is based on an indirect proximity relation.

Figure 8:
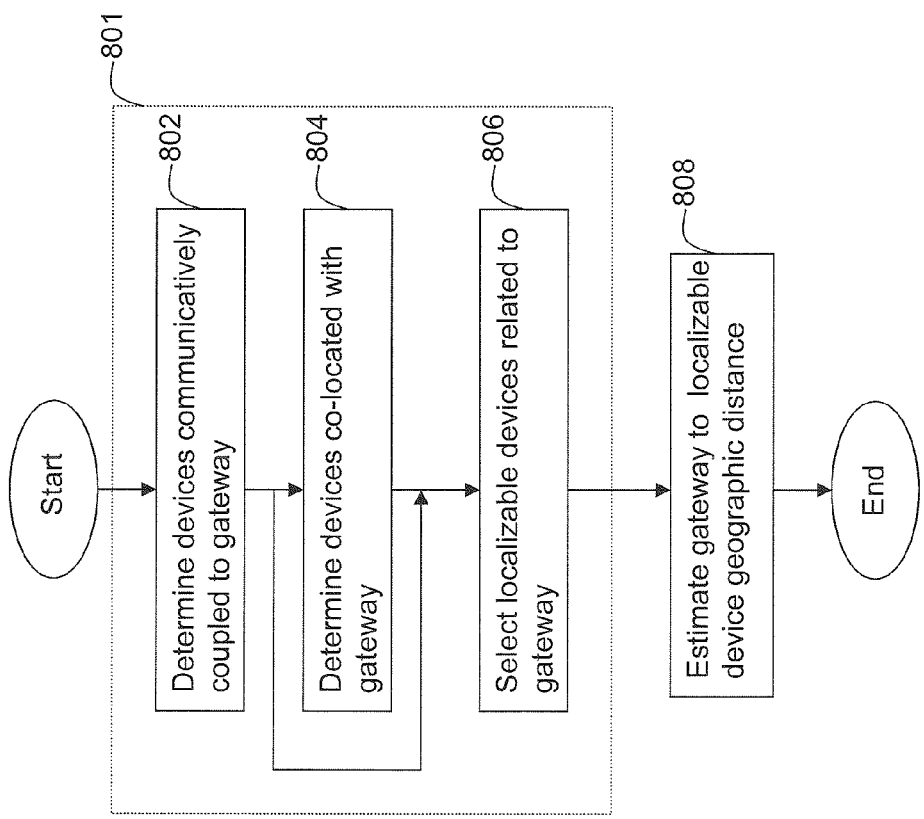
FIG. 8 is a flowchart of a method for creating proximity relationships, according to an embodiment of the present invention.

FIG. 8 illustrates a method 800 for the determination of proximity relationships between gateways and localizable entities, according to an embodiment of the present invention. Method 800 can be used, for example, in the processing of step 702 to determine the proximity relationships of each gateway. In step 802, a set of network entities that are communicatively reachable to the gateway is determined. According to an embodiment, a network entity is communicatively reachable to the gateway if the network entity has an interface on the same network as the gateway. For example, based on the location reports received from hosts 121-126 at location server 102, gateway 112 can have gateway 111 and hosts 121-122 and 124-126 in its set of communicatively reachable network entities.

In step 804, network entities that are co-located with the gateway are determined. Co-located network entities are, for example, other interfaces of the same gateway. Step 804 can be optional in some embodiments. Using the example of gateway 112, the set of co-located network can include wireless interface 173.

In step 806, based on the set of communicatively reachable network entities and the set of co-located network entities, a set of localizable entities that are related to the gateway is determined. For example, gateway 112 can be related to localizable entity 131 based on host 125, to localizable entity 132 based on host 124, and to localizable entity 133 based on host 126. Also, considering the co-located network entities of gateway 112, interface 173 can be related to localizable entity 131 where entity 131 was already detected by host 125. In an embodiment, the IP addresses of the wireless interface 173 of gateway 112 can be compared to the IP addresses of localizable entities 131-133 that are determined to be related to gateway 112 in order to determine which of them have direct proximity relationships and which have indirect proximity relationships. For example, as shown in FIG. 1, interface 173 can have an EP address that may be from an IP subnet that includes localizable entity 131 as interface 173 is within the wireless coverage area 135 of localizable entity 131. Steps 802-806 can be considered as sub steps of a step 801 determining a geographically related localizable entity for each respective gateway.

In step 808, for each proximity relationship that is determined, a geographic location is estimated for the gateway. Following the same example as above, a geographic location can be determined for gateway 112 with respect to each of the localizable entities 131-133 with which it is related. In an embodiment, the geographic location can be determined as the center point of a coverage area of the corresponding localizable entity. In another embodiment, for example, where an indirect proximity relationship exists with a localizable entity, the geographic relation can be based on the center point of the coverage area of the corresponding localizable entity as modified by the range of the network which couples the gateway to that localizable entity. For example, with respect to localizable entity 133, the location of gateway 112 may be estimated as anywhere within a radius of half of the expected range of the wired network 134, as measured from the center of the coverage area 137.

Figure 9:
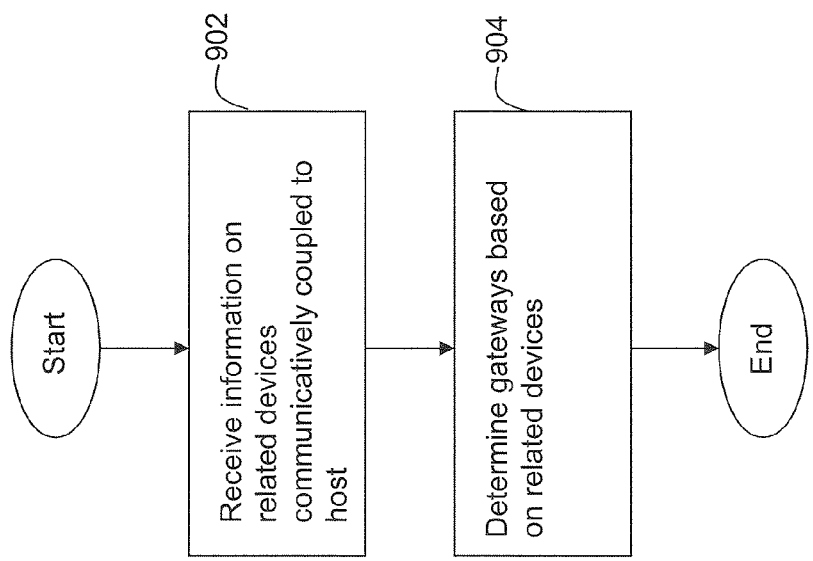
FIG. 9 is a flowchart of a method for determining gateways, according to an embodiment of the present invention.

FIG. 9 illustrates a method 900 for receiving location reports, for example, at a location server. Method 900 can be implemented as part of step 602 to determine gateways. In step 902, the location server receives a plurality of location reports from hosts, where each host identifies network entities that are communicatively reachable to it. For example, host 126 can send a location report that identifies each one of the network entities that are coupled to network 134 and also localizable entity 133. The location reports can also identify multiple interfaces for each of the network entities that area reachable. For example, host 126 can identify gateway 112 as reachable and also identify the two interfaces 141 and 173 of gateway 112. Location reports can also identify the type of network entity, such as identifying localizable entity 133 as a wireless base station, and gateway 112 as a gateway.

In step 904, location reports are analyzed to detect gateway nodes. In an embodiment, location reports are processed to determine gateway nodes and only information pertaining to the gateway nodes are stored in location database 102. Detection of gateway nodes may be based on various methods depending, for example, on the network monitoring methods employed by the hosts that send location reports. In one example, location reports can identify gateway nodes. In another example, the network entities that have multiple interfaces and are not hosts (e.g., those that do not designate themselves as hosts) are considered as gateways.

In another embodiment, a method such as correlation analysis of known MAC addresses or other identifiers can be used to determine or assist the determination of gateways. For example, MAC addresses on the same device, i.e., MAC addresses of co-located interfaces, are often correlated and have a common Organizationally Unique Identifier (OUI). Thus by correlating, for example, MAC addresses detected by hosts on a wired network, and MAC addresses detected by hosts on a wireless network, the MAC address of the wired interface and the MAC address of a wireless interface of a gateway can be determined. The correlation can, in an embodiment, be based on lexicographically clustering MAC addresses belonging one or more partitions (such as partitions defined by OUI) based on an approach such as K-means or Nearest-Neighbor clustering. The wired interface MAC addresses and wireless interface MAC addresses can then be paired based on the least lexicographic distance within a single cluster.

Figure 10:
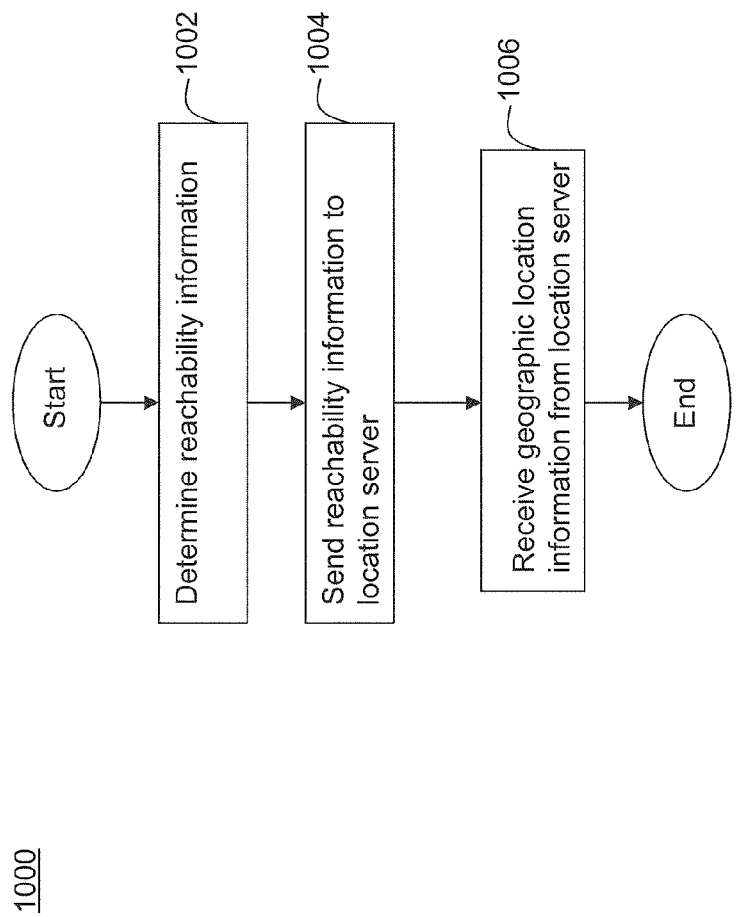
FIG. 10 is a flowchart of a method for a host to determine its geographic location, according to an embodiment of the present invention.

FIG. 10 illustrates a method 1000 used by hosts to determine their geographic location, according to an embodiment of the present invention. For example, host 121 may execute method 1000 to determine its geographic location. Method 1000 can be implemented by, for example, location determiner module 320.

In step 1002, host determines reachability information. Reachability information includes the set of network entities that are communicatively reachable to the host, as well as interfaces that are co-located with each of the communicatively reachable network entities. Reachability information determined by a host includes network entities reachable by any one of its network interfaces.

A host can determine reachability information based on active monitoring or passive monitoring of the network. In active monitoring the host can use IP-based communication protocols such as Dynamic Host Configuration Protocol (DHCP) to determine gateway addresses, Simple Network Management Protocol (SNMP) to determine interfaces co-located at network entities and types of interfaces. In some embodiments, IP-based tools such as ping and traceroute can be used to determine reachability of network entities and their interfaces. On the wireless interfaces, active monitoring can include transmitting probe messages to determine wireless network access points. A standard protocol such as IEEE 802.11 Management Information Base (MIB) protocol can also be used to determine wireless access point information. Other methods to determine reachability information can also include IEEE 802.1d Media Access Control Bridging protocol.

In passive monitoring, the host simply monitors or "sniffs" the packets, for example, IP packets, that can be detected on the network to which it is connected. By such monitoring it can determine source and destination IP addresses and/or MAC addresses that are encoded in those packets. Such IP addresses and MAC addresses are used to determine network entities connected to the same network as the host. For example, IP addresses that have the same subnet as the host's IP address belong to entities on the same network as the host. Also, one or more gateways may be determined based on analysis of packets on the network. For example, IP packets with a destination address outside of the host's network are routed through a gateway, and the destination MAC address of frames containing such packets can indicate a gateway. On the wireless interface, passive monitoring can include listening to beacon messages from WIFI access points and the like.

The MAC address of network entities, particularly gateways, can be used as a more robust identification of a network entity for purposes of location determination, according to embodiments of the present invention. Unlike IP addresses that can change for a given interface, MAC addresses are rarely changed. Therefore, MAC addresses can be used to identify reachable network entities, for example, in location reports sent to the location server. Therefore, in some embodiments, the host can determine the MAC address for network entities, such as gateways. The host, in an embodiment, can use a communication protocol such as the Address Resolution Protocol (ARP) or Reverse Address Resolution Protocol (RARP) to determine the MAC address of an interface based on the IP address of an interface.

The monitoring and collection of data by a host may be continuous, or may be triggered periodically. For example, when a network event occurs, such as connecting to a network, the data collection can be triggered. The host can store the collected data locally until that data is transmitted to a location server using step 1004. Note that a host can monitor the network and collect data regardless of whether connectivity to location server exists.

In step 1004, the host transmits the reachability information to a location server. For example, a host may continually transmit reachability information, or it may do so either periodically or upon the occurrence of a predetermined set of network events. In one embodiment, a host can transmit the collected reachability data to the location server at regular intervals. The frequency of the transmission of reachability information can be determined based on the type of host (e.g., desktop host, mobile host, laptop computer, etc.) and the rate of change in the network to which the host is connected to.

In step 1006, host queries the location server for its geographic location and receives information specifying the geographic location. In an embodiment, when querying, the host also transmits the current location reports. By sending the location reports along with the query, the host enables the location server to provide the location determining service without having to store host specific information that can, in some cases, be privacy sensitive. For example, the location server may store only proximity relations between gateways and localizable entities. In some embodiments, the location reports sent by hosts may not be stored after being used for the purpose of determining proximity relations. In some embodiment, location reports can be stored for a predetermined interval. Subsequently, when a host query is received along with the location reports, the available location reports are analyzed to determine the gateways that area reachable to the host from which the query is received. The proximity relationships for that gateway are then used to determine and return the location information for that host.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of determining a geographic location of a host, comprising:
   identifying at least one gateway communicatively coupled to the host via a network;
   determining a geographic location of the at least one gateway based upon an indirect proximity relationship between the gateway and a localizable entity, wherein the gateway is located at a predetermined percentage portion of the maximum range of the network, wherein the geographic location is based on a center point of a wireless network coverage area of the localizable entity as modified by the range of a wired network communicatively coupling the gateway to the localizable entity; and
   determining the geographic location of the host based upon the determined geographic location of the at least one gateway.

2. The method of claim 1, wherein the identifying at least one gateway, comprises:
   receiving information from one or more hosts identifying related network entities; and
   processing the related network entities to identify at least one gateway.

3. The method of claim 2, wherein the related network entities include network entities communicatively coupled to the host.

4. The method of claim 2, wherein the related network entities include network entities collocated with the host.

5. The method of claim 1, wherein the determining the geographic location of the at least one gateway, comprises:
   identifying the proximity relationship comprising the gateway and the localizable entity; and
   analyzing the proximity relationship to determine the geographic location of the at least one gateway.

6. The method of claim 5, wherein the creating at least one proximity relationship comprises:
   determining the localizable entity that is a geographically related to the gateway; and
   estimating a geographic distance from the gateway to the localizable entity.

7. The method of claim 6, wherein the determining the localizable entity, comprises:
   determining one or more network entities communicatively coupled to the gateway; and
   selecting, from the one or more network entities, the localizable entity based upon availability of geographic location information.

8. The method of claim 6, wherein the determining the localizable entity, comprises:
   determining one or more network entities co-located with the gateway; and
   selecting, from the one or more network entities, the localizable entity based upon availability of geographic location information.

9. The method of claim 6, wherein the analyzing the proximity relationship, comprises:
   correlating one or more proximity relationships.

10. The method of claim 9, wherein the correlating comprises:
    clustering the at least one gateway and one or more localizable entities coupled to the at least one gateway.

11. The method of claim 1, wherein the determining the geographic location of the host, comprises:
    estimating the geographic location of the host based upon tri-laterating geographic locations of the at least one gateway.

12. A method for determining a geographic location of a host, comprising:
    determining reachability information from a host to communicatively coupled network entities, wherein the reachability information includes reachability via a wired network to a gateway within the coverage area of a wireless network of a wireless base station, wherein the gateway is located at a predetermined percentage portion of the maximum range of the wired network;
    sending the reachability information to a location server, wherein the location server determines the geographic location of the host based on the reachability information and a location of the wireless base station; and
    receiving the geographic location information of the host from the location server.

13. The method of claim 12, wherein reachability information includes information on one or more gateways communicatively coupled to the host.

14. The method of claim 12, wherein reachability information includes information on one or more localizable entities communicatively coupled to the host.

15. The method of claim 12, further comprising:
    determining network entities co-located with the host; and
    sending information regarding the co-located network entities to the location server.

16. A system for determining a geographic location of a host, comprising:
    at least one processor;
    a network interface coupled to the processor;
    at least one memory coupled to the processor, the memory comprising:
    a location server, configured to:
    identify at least one gateway coupled to the host via a network;
    determine a geographic location of the at least one gateway based upon a proximity relationship between the gateway and a localizable entity, wherein the gateway is located at a predetermined percentage portion of the maximum range of the network, wherein the geographic location is based on a center point of a wireless network coverage area of the localizable entity as modified by the range of a wired network communicatively coupling the gateway to the localizable entity;

determine the geographic location of the host based upon the determined geographic location of the at least one gateway; and transmit the geographic location of the host.

17. The system of claim 16, comprising:

one or more hosts communicatively coupled to the location server, each said one or more hosts configured to:

determine reachability information to communicatively coupled network entities;

transmit the reach ability information to a location server; and receive a geographic location information from the location server.

18. The system of claim 16, the memory further comprising:

a database configured to store proximity relationships, each proximity relationship comprising a gateway from the one or more gateways and a respective localizable entity.

19. The system of claim 16, wherein the localizable entity is a component of a wireless network.

20. The system of claim 16, wherein the respective localizable entity is a component of a wired network.

* * * * *